(12) United States Patent
Yeh et al.

(10) Patent No.: US 10,692,294 B1
(45) Date of Patent: Jun. 23, 2020

(54) SYSTEMS AND METHODS FOR MEDIATED AUGMENTED PHYSICAL INTERACTION

(71) Applicant: Universal City Studios LLC, Universal City, CA (US)

(72) Inventors: Wei Cheng Yeh, Orlando, FL (US); Travis Jon Cossairt, Celebration, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/293,331

(22) Filed: Mar. 5, 2019

Related U.S. Application Data

(60) Provisional application No. 62/780,669, filed on Dec. 17, 2018.

(51) Int. Cl.
| | | |
|---|---|---|
| *G06T 19/00* | (2011.01) | |
| *G06T 19/20* | (2011.01) | |
| *G06F 3/01* | (2006.01) | |

(52) U.S. Cl.
CPC ............ *G06T 19/006* (2013.01); *G06F 3/017* (2013.01); *G06T 19/20* (2013.01)

(58) Field of Classification Search
CPC ............................... G06T 19/006; G06F 3/011
See application file for complete search history.

(56) References Cited

U.S. PATENT DOCUMENTS

| 9,191,450 | B2 | 11/2015 | Sidi et al. |
| 9,504,930 | B2 | 11/2016 | Cortelyou et al. |
| 9,616,350 | B2 | 4/2017 | Stenzler et al. |
| 9,690,373 | B2 | 6/2017 | Haseltine |
| 9,741,145 | B2 | 8/2017 | Mitchell et al. |
| 10,362,299 | B1 * | 7/2019 | Niemeyer ........... G06F 3/04815 |
| 2013/0083008 | A1 | 4/2013 | Geisner et al. |
| 2014/0132400 | A1 | 5/2014 | Heaven et al. |
| 2014/0240102 | A1 | 8/2014 | Kawash et al. |
| 2015/0258434 | A1 | 9/2015 | Scott et al. |
| 2016/0275722 | A1 | 9/2016 | Bretschneider et al. |
| 2018/0078858 | A1 | 3/2018 | Chai et al. |
| 2018/0117465 | A1 | 5/2018 | Voris et al. |
| 2018/0124261 | A1 | 5/2018 | Weeks |

(Continued)

OTHER PUBLICATIONS

PCT/US2019/065290 International Search Report and Written Opinion dated Mar. 18, 2020.

*Primary Examiner* — Jeffery A Brier
(74) *Attorney, Agent, or Firm* — Fletcher Yoder P.C.

(57) ABSTRACT

A system includes an image generation system for generating streaming media of a real-world environment based at least in part on image data captured via a camera of a mobile device, to generate one or more augmentations superimposed on the streaming media of the real-world environment based at least in part on data relating to user interaction with the mobile device, and to transmit the streaming media of the real-world environment along with the one or more augmentations to be displayed on a display of the mobile device. The system also includes a physical interaction system for determining one or more physical effects to be implemented for a physical object in the real-world environment based at least in part on the data relating to the user interaction with the mobile device, and to transmit a signal to the physical object to implement the determined one or more physical effects.

23 Claims, 5 Drawing Sheets

(56) References Cited

U.S. PATENT DOCUMENTS

2018/0253141 A1    9/2018  McCracken
2018/0329480 A1   11/2018  Schwartz et al.
2019/0202055 A1*   7/2019  Wang ..................... H04N 7/183
2019/0278295 A1*   9/2019  Matsuno ............... G06T 19/003

* cited by examiner

SYSTEMS AND METHODS FOR MEDIATED AUGMENTED PHYSICAL INTERACTION

CROSS-REFERENCE TO RELATED APPLICATION

This application claims priority to and the benefit of U.S. Provisional Application No. 62/780,669, entitled "Systems and Methods for Mediated Augmented Physical Interaction," filed Dec. 17, 2018, which is hereby incorporated by reference in its entirety for all purposes.

BACKGROUND

The subject matter disclosed herein relates to amusement park attractions and, more specifically, to facilitating guest interaction with physical objects of the amusement park via mobile devices.

Since the early twentieth century, amusement parks (or theme parks) have grown substantially in popularity. Accordingly, there has been an increased demand and an accompanying increase in competition with respect to amusement parks. It is therefore desirable to add more entertaining and larger numbers of attractions to amusement parks. The addition of large attractions, such as rides and shows, generally provides an amusement park with additional capacity to handle a larger number of guests. However, such attractions tend to draw more visitors and become hubs for guest traffic. Further, the addition of traditional rides without an added layer of intrigue may be insufficient to garner sufficient guest interest to address either guest traffic issues or provide an advantage over competitors. Accordingly, it is now recognized that systems and methods that facilitate distribution of guest traffic and/or provide increased levels of entertainment value are desirable.

This section is intended to introduce the reader to various aspects of art that may be related to various aspects of the present techniques, which are described and/or claimed herein. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the present disclosure are summarized herein. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth herein.

In an embodiment, an amusement park system includes an image generation system configured to be communicatively coupled to a mobile device. The image generation system is configured to generate streaming media of a real-world environment based at least in part on image data captured via a camera of the mobile device. The image generation system is also configured to generate one or more augmentations superimposed on the streaming media of the real-world environment based at least in part on data relating to user interaction with the mobile device. The image generation system is further configured to transmit the streaming media of the real-world environment along with the one or more augmentations to be displayed on a display of the mobile device. The amusement park system also includes a physical interaction system configured to be communicatively coupled to the mobile device. The physical interaction system is configured to determine one or more physical effects to be implemented for a physical object in the real-world environment based at least in part on the data relating to the user interaction with the mobile device. The physical interaction system is also configured to transmit a signal to the physical object to implement the determined one or more physical effects.

In an embodiment, a method includes receiving, via an image generation system, a real-time video data stream from a mobile device. The method also includes generating, via the image generation system, a visualization of a real-world environment of an amusement park based at least in part on the received real-time video data stream. The method further includes overlaying, via the image generation system, an augmented reality (AR) image onto the visualization of the real-world environment based at least in part on data relating to user interaction with the mobile device. In addition, the method includes determining, via a physical interaction system, one or more physical effects to be implemented for a physical object in the real-world environment based at least in part on the data relating to the user interaction with the mobile device. The method also includes transmitting, via the image generation system, the overlaid AR image along with the visualization of the real-world environment to the mobile device. The method further includes transmitting, via the physical interaction system, a signal to the physical object to implement the determined one or more physical effects.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
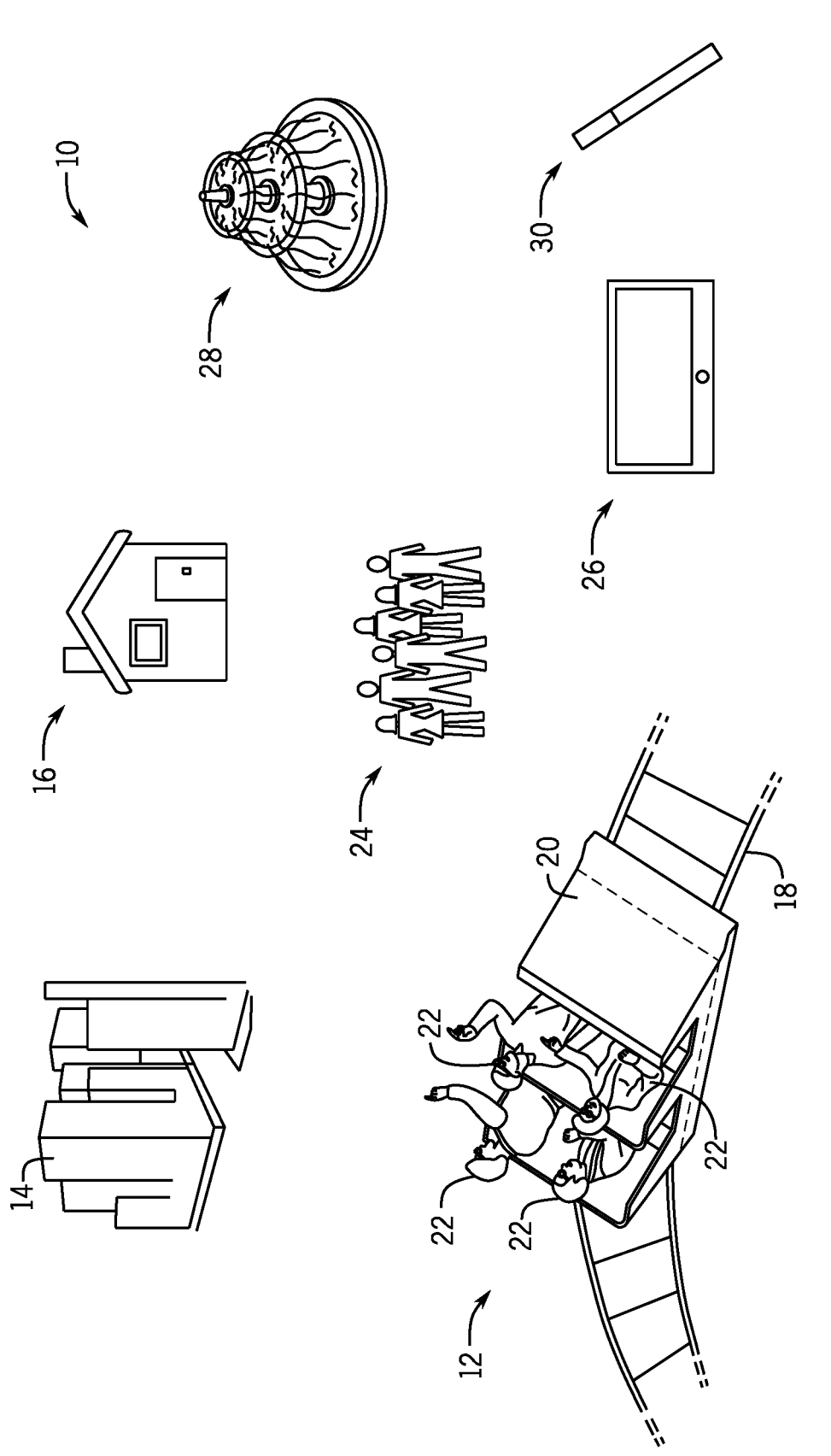
FIG. 1 illustrates an amusement park including one or more attractions, in accordance with embodiments of the present disclosure.

One or more specific embodiments of the present disclosure will be described herein. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments relate to systems and methods of providing an augmented reality (AR) experience as part of an attraction, such as a thrill ride, in an amusement park or theme park. In certain embodiments, patrons of the amusement park may use mobile devices and other auxiliary devices that facilitate both the AR experience as well as facilitating manipulation of the physical objects disposed within the amusement park. Specifically, in certain embodiments, the mobile devices may be configured to capture real-time video data (e.g., video captured during live use and transmitted in substantially real-time) of the real-world environment (e.g., aspects of the physical amusement park). In addition, in certain embodiments, an image generation system may receive the real-time video data (e.g., live video that is transmitted in substantially real-time) from the mobile devices, and may render a video stream of the real-world environment along with various AR images to the mobile devices to be displayed on displays of the mobile devices.

For example, in certain embodiments, the image generation system may render the AR images to the mobile devices based at least in part on, for example, in certain embodiments, the position and/or orientation of the mobile devices, proximity of the mobile devices with respect to particular physical objects disposed in the real-world environment of the amusement park, detected manipulations of the mobile devices (e.g., movements of the mobile devices, patrons' interactions via user interfaces of the mobile devices, and so forth) as well as auxiliary devices manipulated by the patrons, local settings entered by the patrons into the mobile devices, global settings of the amusement park (e.g., as entered by proprietors of the amusement park), prior interactions performed via the mobile devices, and so forth. In certain embodiments, the mobile devices, auxiliary devices, physical objects of the amusement park, and so forth, may be monitored by a monitoring system, which may communicate data (e.g., identification, position, orientation, movement, velocity, acceleration, and so forth) relating to the mobile devices, auxiliary devices, physical objects of the amusement park, and so forth, to the image generation system, such that the image generation system may generate the AR images based at least in part on the data relating to the mobile devices, auxiliary devices, physical objects of the amusement park, and so forth.

In addition, in certain embodiments, the monitoring system may be configured to communicate with a physical interaction system that is configured to cause physical effects (e.g., movement effects, sound effects, haptic feedback effects, color effects, scented effects, and so forth) of the physical objects disposed within the real-world environment of the amusement park based at least in part on the data relating to the mobile devices, auxiliary devices, physical objects of the amusement park, and so forth. In certain embodiments, the physical effects of the physical objects disposed within the real-world environment of the amusement park may be caused based at least in part on data received from the mobile devices, the auxiliary devices, the physical objects, and so forth.

In this way, by using the mobile devices, the auxiliary devices, the image generation system, the monitoring system, and the physical interaction system to create and display the AR experience, as well as facilitating patrons' ability to cause physical effects of the physical objects disposed within the real-world environment of the amusement park, the patrons' overall experience within the amusement park may be enhanced. However, it should be appreciated that the techniques described herein may not be limited to amusement park attraction applications, but may also be extended to any of various applications such as, for example, medical applications (e.g., image-guided surgery, noninvasive imaging analysis), engineering design applications (e.g., engineering model development), manufacturing, construction, and maintenance applications (e.g., products manufacturing, new building construction, automobile repairs), academic and/or vocational training applications, exercise applications (e.g., bodybuilding and weight loss models), television (TV) applications (e.g., weather and news), and the like.

With the foregoing in mind, it may be useful to describe an embodiment of an amusement park, such as an example amusement park 10 as depicted in FIG. 1. As illustrated, the amusement park 10 may include a thrill ride 12, amusement park facilities 14 (e.g., restaurants, souvenir shops, and so forth), and additional amusement attractions 16. In certain embodiments, the thrill ride 12 may include a rollercoaster or other similar thrill ride, and may thus further include a closed-loop track or a system of closed-loop tracks 18 (e.g., miles of tracks 18). The tracks 18 may be provided as an infrastructure on which a passenger ride vehicle 20 may traverse.

As the passenger ride vehicle 20 traverses the tracks 18, the ride passengers 22 may be provided a moving tour of the scenery (e.g., facilities 14, additional amusement attractions 16, and so forth) in an area around or nearby the thrill ride 12. For example, this may include the environment surrounding the thrill ride 12 (e.g., a building that fully or partially houses the thrill ride 12). While the ride passengers 22 may find the thrill ride 12 to be a very enjoyable experience, in certain embodiments, it may be useful to enhance the experience of the ride passengers 22 as the ride passengers 22 ride the thrill ride 12 by enhancing, for example, the thrill factor of the thrill ride 12. Specifically, instead of having a physical view of only the facilities 14 (e.g., restaurants, souvenir shops, and so forth), additional amusement attractions 16 (e.g., attractions that are themed relative to the amusement park 10), or other patrons 24 within the amusement park 10, it may be useful to provide the ride passengers 22 with an AR experience as the ride vehicle 20 traverses the tracks 18.

Similarly, while patrons 24 of the amusement park may find the facilities 14, additional amusement attractions 16, and so forth, of the amusement park 10 entertaining in and of themselves, in certain embodiments, it may be useful to enhance the experience of the patrons 24 as they walk through the facilities 14, additional amusement attractions 16, and so forth, of the amusement park 10. Specifically, it may also be useful to provide the patrons 24 with an AR experience with respect to the facilities 14, additional amusement attractions 16, and so forth, of the amusement park 10.

For example, as illustrated in FIG. 1, in certain embodiments, the ride passengers 22 and other patrons 24 of the amusement park 10 may use mobile devices 26 that facilitate interaction with physical objects 28 disposed in the real-world environments surrounding the thrill ride 12, the facilities 14, additional amusement attractions 16, and so forth, of the amusement park 10. Specifically, as described in greater detail herein, in certain embodiments, the mobile devices 26 may be configured to provide an AR view of the environments surrounding the thrill ride 12, the facilities 14, additional amusement attractions 16, and so forth, and also to enable the ride passengers 22 and other patrons 24 of the amusement park 10 to cause physical effects (e.g., movement effects, sound effects, haptic feedback effects, color effects, scented effects, and so forth) of the physical objects 28 via manipulation of the mobile devices 26. Furthermore, as also described in greater detail herein, in certain embodiments, the mobile devices 26 may be used in conjunction with auxiliary devices 30 to enable the ride passengers 22 and other patrons 24 of the amusement park 10 to cause the physical effects of the physical objects 28. In certain embodiments, the auxiliary devices 30 may be amusement park theme-related objects, such as toy guns, flags, wands, and so forth.

Figure 2:
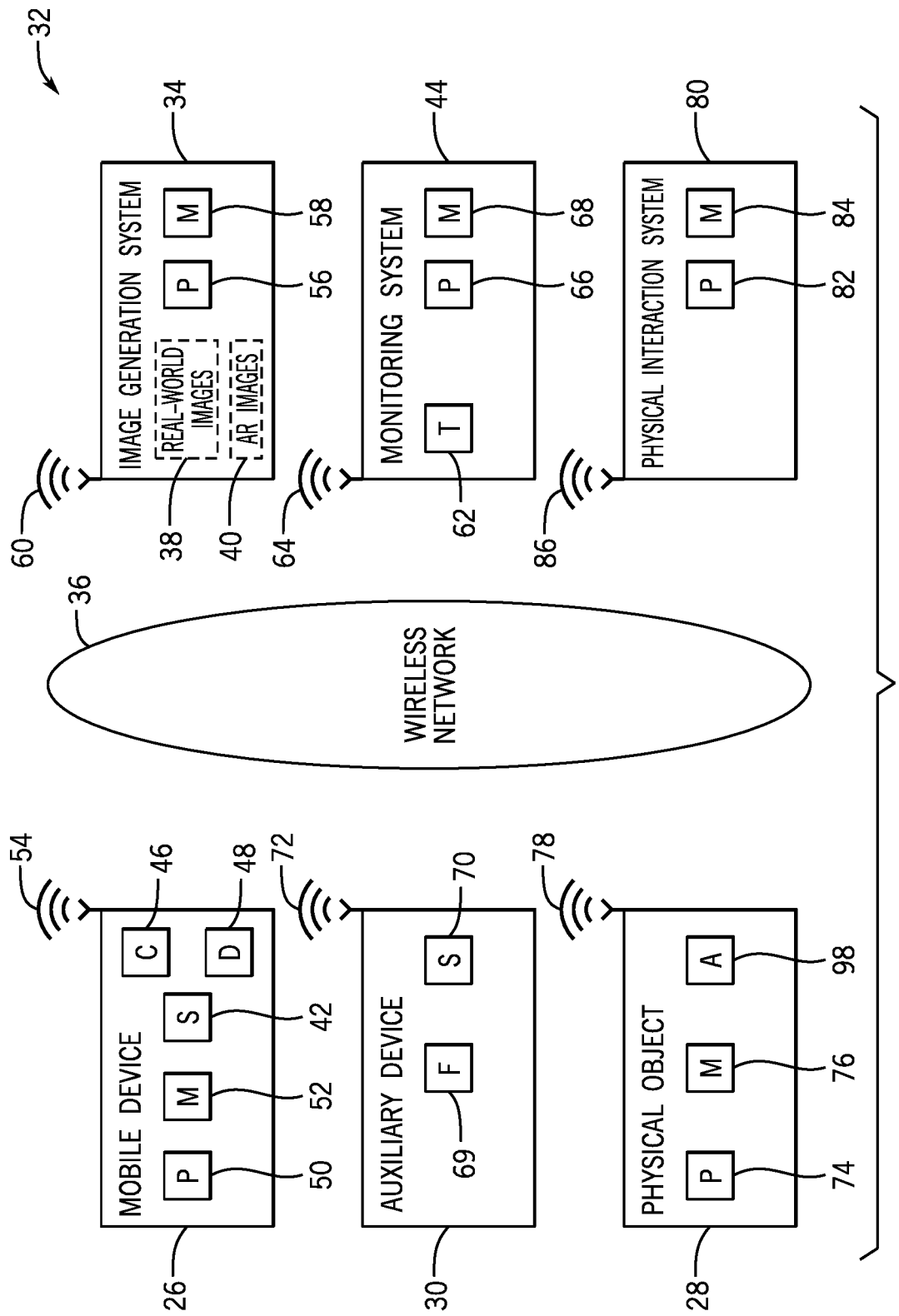
FIG. 2 is a schematic diagram of a system for providing an AR experience for the amusement park illustrated in FIG. 1, in accordance with embodiments of the present disclosure.

FIG. 2 is a schematic diagram of a system 32 for providing an AR experience for the amusement park 10 illustrated in FIG. 1, in accordance with embodiments of the present disclosure. As illustrated in FIG. 2, in certain embodiments, the system 32 may include one or more mobile devices 26 that may be used by the ride passengers 22 and other patrons 24 of the amusement park 10. The mobile device 26 may be communicatively coupled to an image generation system 34 (e.g., within the amusement park 10) via a wireless network 36 (e.g., wireless local area networks (WLAN]), wireless wide area networks (WWAN), near field communication (NFC) networks, or any other suitable wireless networks). The mobile device 26 may be used to create an AR experience for a real-world environment of the amusement park 10. Specifically, as described in greater detail herein, the AR experience viewable via the mobile device may be a real-time video including real-world images 38 electronically merged with one or more AR images 40 (e.g., virtual augmentations). The term "real-time" indicates that the images are obtained and/or provided in a timeframe substantially close to the time of actual observation.

In certain embodiments, the mobile device 26 may be a mobile phone (e.g., a smartphone), a tablet computer, a wearable device (e.g., such as glasses, goggles, watches, and so forth) or any other suitable device that can be carried around the amusement park 10 by a ride passenger 22 or other patron 24, and that can display an AR experience for the ride passenger 22 or other patron 24. In certain embodiments, the mobile device 26 may include a number of orientation and position sensors 42 (e.g., accelerometers, magnetometers, gyroscopes, Global Positioning System (GPS) receivers, motion tracking sensors such as electro-magnetic and solid-state motion tracking sensors, and so forth) that may be used to track the position, location, orientation, motion, and so forth, of the mobile device 26. Similarly, in certain embodiments, features of the mobile device 26 (e.g., geometric aspects or markings) may be monitored by a monitoring system 44 (e.g., one or more cameras, in certain embodiments) to determine the position, location, orientation, motion, and so forth, of the mobile device 26. Furthermore, in certain embodiments, the ride passengers 22 and other patrons 24 may be monitored by the monitoring system 44 (e.g., a camera) to identify the position, location, orientation, motion, and so forth, of the ride passengers 22 and other patrons 24.

In addition, in certain embodiments, the mobile device 26 may include one or more cameras 46 configured to capture images and video (e.g., the real-world images), and to display the captured images and video (as well the AR images 40) via one or more displays 48 of the mobile device 26. In certain embodiments, to support the creation of the AR experience, the mobile device 26 may include processing circuitry, such as a processor 50 and a memory 52. The processor 50 may be operatively coupled to the memory 52 to execute instructions for at least partially carrying out (e.g., in conjunction with the image generation system 34) the presently disclosed techniques of generating real-world images 38 merged with AR images 40 to enhance the experience of the ride passengers 22 and other patrons 24. These instructions may be encoded in programs or code stored in a tangible non-transitory computer-readable medium, such as the memory 52 and/or other storage. In certain embodiments, the processor 50 may be a general-purpose processor, system-on-chip (SoC) device, an application-specific integrated circuit (ASIC), or some other similar processor configuration.

In certain embodiments, the one or more displays 48 may each include a liquid crystal display (LCD), an organic light emitting diode (OLED) display, or other similar display useful in displaying the real-world images 38 and the AR images 40 to the ride passengers 22 and other patrons 24. In certain embodiments, the one or more displays 48 may each include an opaque or see-through LCD or an opaque or see-through OLED display useful in allowing, for example, the ride passengers 22 and other patrons 24 to view the real-world images 38 and the AR images 40 appearing on the displays 48 while preserving the ability to see through the respective displays 48 to the actual and physical real-world environment of the amusement park 10.

The one or more cameras 46 of the mobile device 26 may be used to capture real-time video data (e.g., live video) of the real-world environment of the amusement park 10. In certain embodiments, the mobile device 26 may then transmit (e.g. wirelessly via one or more communications interfaces 54 included in the mobile device 26) real-time video data captured via the one or more cameras 46 to the image generation system 34 for processing. However, in other embodiments, the real-time video data captured via the one or more cameras 46 may be processed on the mobile device 26 via the processor 50. Indeed, in certain embodiments, the image generation system 34 may be integral with the mobile device 26. In addition, in certain embodiments, the mobile device 26 may also transmit orientation data, position data, motion tracking data, and so forth, obtained and/or derived based at least in part on data obtained via the orientation and position sensors 42 of the mobile device 26.

In certain embodiments, as described in greater detail herein, the image generation system 34, which may also include processing circuitry, such as a processor 56 (e.g., general purpose processor or other processor) and a memory 58, may process the real-time video data (e.g., live video)

and orientation data, position data, and motion tracking data received from the mobile device 26 and/or from the monitoring system 44 via one or more communications interfaces 60 of the image generation system 34. Furthermore, in certain embodiments, in addition to the AR images 40 (e.g., AR augmentations), the image generation system 34 may also trigger one or more movement effects, sound effects, haptic feedback effects, color effects, scented effects, and so forth, to be implemented via internal components of the mobile device 26 that may coincide with the appearances of the AR images 40 on the mobile device 26. Instructions to perform these functions may be encoded in programs or code stored in a tangible non-transitory computer-readable medium, such as the memory 58 and/or other storage. In certain embodiments, the processor 56 may be a general-purpose processor, system-on-chip (SoC) device, an application-specific integrated circuit (ASIC), or some other similar processor configuration.

In certain embodiments, the image generation system 34 may use the orientation data, position data, and motion tracking data received from the mobile device 26 and/or from the monitoring system 44 to generate a frame of reference to register the real-time video data with the generated real-world images 38 and the AR images 40. In certain embodiments, the image generation system 34 may constantly update (e.g., in real-time) the rendering of the real-world images 38 to reflect changes with respect to orientation, position, and/or motion of the mobile device 26. To aid in the viewability of the rendered images, in certain embodiments, the image generation system 34 may render images (e.g., real-world images 38 and AR images 40) at a real-time rate greater than or equal to approximately 20 frames per second (FPS), greater than or equal to approximately 30 FPS, greater than or equal to approximately 40 FPS, greater than or equal to approximately 50 FPS, greater than or equal to approximately 60 FPS, greater than or equal to approximately 90 FPS, or greater than or equal to approximately 120 FPS.

In certain embodiments, as described in greater detail herein, the image generation system 34 may also generate and render one or more AR images 40 superimposed on the real-world images 38 to create a complete AR experience for the ride passengers 22 or other patrons 24. For example, in certain embodiments, the image generation system 34 may utilize one or more of the discussed video merging and/or optical merging techniques to superimpose the AR images 40 onto the real-world images 38, such that the ride passengers 22 and other patrons 24 perceive the real-world physical environment of the amusement park 10 (e.g., provided as rendered video data via the respective displays 48) along with the AR images 40 (e.g., virtual augmentations) via the one or more displays 48 of the mobile device 26. Specifically, in certain embodiments, the image generation system 34 may render a view of the AR images 40 that is temporally and spatially commensurate with the real-world images 38, such that the real-world images 38 may appear as a background overlaid with the AR images 40.

In certain embodiments, the image generation system 34 may also generate one or more brightness, lighting, or shading models, and/or other photorealistic rendering models to generate the real-world images 38 and the AR images 40 adjusted to accurately reflect contrast and brightness of the real-world physical environment (e.g., sunny day, partly cloudy day, cloudy day, evening, night) in rendering the real-world images 38 and the AR images 40. For example, in certain embodiments, to increase the photorealism of the real-world images 38 and the AR images 40, the image generation system 34 may receive weather-related data from one or more weather forecast and/or prediction systems (e.g., Global Forecast System, Doppler radars, and so forth), and use the weather-related data or other similar data to adjust the contrast, brightness, and/or other lighting effects of the real-world images 38 and/or the AR images 40. In other embodiments, the image generation system 34 may adjust the contrast, brightness, and/or other lighting effects of the real-world images 38 and/or the AR images 40 based at least in part on lighting detected from one or more light sensors included in the mobile device 26 or based at least in part on the real-time video data captured by the cameras 46 of the mobile device 26. Furthermore, as previously noted, the image generation system 34 may constantly update (e.g., in real-time) the rendering of the AR images 40 to reflect changes with respect to orientations, positions, and/or motion of the mobile device 26.

In addition, in certain embodiments, as described in greater detail herein, the image generation system 34 may generate and render the one or more AR images 40 based at least in part on data relating to manipulations of the mobile device 26, which may be detected by the mobile device 26. For example, in certain embodiments, the one or more displays 48 of the mobile device 26 may comprise touch screen displays (or other user interfaces), through which a ride passenger 22 or other patron 24 may attempt to manipulate objects displayed on the one or more displays 48 (e.g., via finger swiping, finger pinching, finger tapping, and so forth), whether the objects are real-world objects as part of the real-world images 38 or AR-generated objects of the AR images 40 depicted via the one or more displays 48. Then, the manipulations detected by the mobile device 26 may be communicated to the image generation system 34 via the one or more communications interfaces 54 of the mobile device 26, and the image generation system 34 may generate AR images 40 to be displayed on the one or more displays 48 of the mobile device 26 based at least in part on the detected manipulations.

Furthermore, in certain embodiments, as described in greater detail herein, the image generation system 34 may generate and render the one or more AR images 40 based at least in part on orientation data, position data, and motion tracking data of the mobile device 26, which may be detected by the orientation and position sensors 42 of the mobile device 26. The orientation data, position data, and motion tracking data of the mobile device 26 may be communicated to the image generation system 34 via the one or more communications interfaces 54 of the mobile device 26, and the image generation system 34 may generate AR images 40 to be displayed on the one or more displays 48 of the mobile device 26 based at least in part on the orientation data, position data, and motion tracking data of the mobile device 26.

Similarly, in certain embodiments, as described in greater detail herein, the image generation system 34 may generate and render the one or more AR images 40 based at least in part on orientation data, position data, and motion tracking data of the mobile device 26, which may be detected by the monitoring system 44. For example, in certain embodiments, the monitoring system 44 may include one or more tracking devices 62 (e.g., one or more cameras, in certain embodiments) configured to detect orientation data, position data, and motion tracking data of the mobile device 26. Then, the monitoring system 44 may communicate the orientation data, position data, and motion tracking data of the mobile device 26 to the image generation system 34 via one or more communications interfaces 64 of the monitoring system 44, and the image generation system 34 may generate AR images 40 to be displayed on the one or more displays 48 of the mobile device 26 based at least in part on the orientation data, position data, and motion tracking data of the mobile device 26. Furthermore, in certain embodiments, the monitoring system 44 may include processing circuitry, such as a processor 66 (e.g., general purpose processor or other processor) and a memory 68, and may process the orientation data, position data, and motion tracking data of the mobile device 26 detected by the one or more tracking devices 62 to, for example, convert the orientation data, position data, and motion tracking data of the mobile device 26 into a form suitable for the image generation system 34. Instructions to perform these functions may be encoded in programs or code stored in a tangible non-transitory computer-readable medium, such as the memory 68 and/or other storage. In certain embodiments, the processor 66 may be a general-purpose processor, system-on-chip (SoC) device, an application-specific integrated circuit (ASIC), or some other similar processor configuration.

In addition, in certain embodiments, as described in greater detail herein, the image generation system 34 may generate and render the one or more AR images 40 based at least in part on data relating to an auxiliary device 30, which may be used in conjunction with the mobile device 26. In certain embodiments, the auxiliary device 30 may be amusement park theme-related objects, such as toy guns, flags, wands, and so forth. In certain embodiments, the auxiliary device 30 may be a passive object (i.e., that includes no sensors, control circuitry, and so forth), the orientation, position, and motion of which may, for example, be tracked by the monitoring system 44. In such embodiments, certain features 69 of the auxiliary device 30, such as passive features (e.g., geometric aspects or markings, radio frequency identification (RFID) tags, and so forth) or more active features (e.g., wireless transmitters, such as ultra-wideband (UWB) radio transmitters, and so forth) may be monitored by the monitoring system 44 to determine the orientation, position, and motion, and so forth, of the auxiliary device 30. In addition, in certain embodiments, the auxiliary device 30 may include a number of orientation and position sensors 70 (e.g., accelerometers, magnetometers, gyroscopes, Global Positioning System (GPS) receivers, motion tracking sensors such as electromagnetic and solid-state motion tracking sensors, and so forth) that may be used by the monitoring system 44 to track the orientation, position, and motion, and so forth, of the auxiliary device 30.

As such, in certain embodiments, as described in greater detail herein, the image generation system 34 may generate and render the one or more AR images 40 based at least in part on data relating to manipulations of the auxiliary device 30, which may be detected by the auxiliary device 30. For example, in certain embodiments, the orientation, position, and motion, and so forth, detected by the orientation and position sensors 70 of the auxiliary device 30 may be communicated to the image generation system 34 via one or more communications interfaces 72 of the auxiliary device 30, and the image generation system 34 may generate AR images 40 to be displayed on the one or more displays 48 of the mobile device 26 based at least in part on the orientation data, position data, and motion tracking data of the auxiliary device 30.

Similarly, in certain embodiments, as described in greater detail herein, the image generation system 34 may generate and render the one or more AR images 40 based at least in part on orientation data, position data, and motion tracking data of the auxiliary device 30, which may be detected by the monitoring system 44. For example, in certain embodiments, the one or more tracking devices 62 of the monitoring system 44 may detect orientation data, position data, and motion tracking data of the auxiliary device 30. Then, the monitoring system 44 may communicate the orientation data, position data, and motion tracking data of the auxiliary device 30 to the image generation system 34 via the one or more communications interfaces 64 of the monitoring system 44, and the image generation system 34 may generate AR images 40 to be displayed on the one or more displays 48 of the mobile device 26 based at least in part on the orientation data, position data, and motion tracking data of the auxiliary device 30. Furthermore, in certain embodiments, the processing circuitry of the monitoring system 44 may process the orientation data, position data, and motion tracking data of the auxiliary device 30 detected by the one or more tracking devices 62 to, for example, convert the orientation data, position data, and motion tracking data of the auxiliary device 30 into a form suitable for the image generation system 34.

Similarly, in certain embodiments, as described in greater detail herein, the image generation system 34 may generate and render the one or more AR images 40 based at least in part on orientation data, position data, and motion tracking data of the ride passengers 22 and other patrons 24, which may be detected by the monitoring system 44. For example, in certain embodiments, the one or more tracking devices 62 of the monitoring system 44 may detect orientation data, position data, and motion tracking data of the ride passengers 22 and other patrons 24 (e.g., including detecting the bodies of the ride passengers 22 and other patrons 24, detecting patterns of hand gestures of the ride passengers and other patrons 24, and so forth). Then, the monitoring system 44 may communicate the orientation data, position data, and motion tracking data of the ride passengers 22 and other patrons 24 to the image generation system 34 via the one or more communications interfaces 64 of the monitoring system 44, and the image generation system 34 may generate AR images 40 to be displayed on the one or more displays 48 of the mobile device 26 based at least in part on the orientation data, position data, and motion tracking data of the ride passengers 22 and other patrons 24. Furthermore, in certain embodiments, the processing circuitry of the monitoring system 44 may process the orientation data, position data, and motion tracking data of the ride passengers 22 and other patrons 24 detected by the one or more tracking devices 62 to, for example, convert the orientation data, position data, and motion tracking data of the ride passengers 22 and other patrons 24 into a form suitable for the image generation system 34.

Similarly, in certain embodiments, as described in greater detail herein, the image generation system 34 may generate and render the one or more AR images 40 based at least in part on orientation data, position data, and motion tracking data of the thrill rides 12, facilities 14, additional amusement attractions 16, and/or other physical objects 28 of the amusement park 10, which may be detected by the monitoring system 44. For example, in certain embodiments, the one or more tracking devices 62 of the monitoring system 44 may detect three-dimensional props disposed around the amusement park 10, two-dimensional graphics in the environments of the amusement park 10, and other physical features relating to the thrill rides 12, facilities 14, additional amusement attractions 16, and/or other physical objects 28 of the amusement park 10. Then, the monitoring system 44 may communicate orientation data, position data, and motion tracking data relating to the physical features of the thrill rides 12, facilities 14, additional amusement attractions 16, and/or other physical objects 28 of the amusement park 10 to the image generation system 34 via the one or more communications interfaces 64 of the monitoring system 44, and the image generation system 34 may generate AR images 40 to be displayed on the one or more displays 48 of the mobile device 26 based at least in part on the orientation data, position data, and motion tracking data relating to the physical features of the thrill rides 12, facilities 14, additional amusement attractions 16, and/or other physical objects 28 of the amusement park 10.

Furthermore, in certain embodiments, the processing circuitry of the monitoring system 44 may process the orientation data, position data, and motion tracking data of the physical features of the thrill rides 12, facilities 14, additional amusement attractions 16, and/or other physical objects 28 of the amusement park 10 to, for example, convert the orientation data, position data, and motion tracking data of the physical features of the thrill rides 12, facilities 14, additional amusement attractions 16, and/or other physical objects 28 of the amusement park 10 into a form suitable for the image generation system 34. As such, the image generation system 34 may use these detected physical features of the thrill rides 12, facilities 14, additional amusement attractions 16, and/or other physical objects 28 of the amusement park 10 as AR markers (i.e., points of reference, such as for position indexing, and so forth) for determining the one or more AR images 40 to be generated. As such, these physical feature markers aid in the initial placement and orientation of the three-dimensional world space for the image generation system 34, which lends itself to both improved AR visualization as well as tying the ride passengers 22 and other patrons 24 to the three-dimensional world space.

Furthermore, in certain embodiments, as described in greater detail herein, the image generation system 34 may generate and render the one or more AR images 40 based at least in part on data relating to certain physical objects 28 of the amusement park 10. For example, in certain embodiments, the physical objects 28 may include processing circuitry, such as a processor 74 and a memory 76. The processor 74 may be operatively coupled to the memory 76 to execute instructions for determining and/or setting certain operational states for the particular physical object 28. These instructions may be encoded in programs or code stored in a tangible non-transitory computer-readable medium, such as the memory 76 and/or other storage. In certain embodiments, the processor 74 may be a general-purpose processor, system-on-chip (SoC) device, an application-specific integrated circuit (ASIC), or some other similar processor configuration. In certain embodiments, the processor 74 of a particular physical object 28 may be configured to determine whether a particular physical effect has been activated for the physical object 28, and communicate this determination to the image generation system 34 via one or more communications interfaces 78 of the physical object 28, and the image generation system 34 may generate AR images 40 to be displayed on the one or more displays 48 of the mobile device 26 based at least in part on this determination.

As described in greater detail herein, in addition to facilitating the generation of an AR experience via the mobile device 26, in certain embodiments, the systems and methods described herein enable the generation of physical effects (e.g., movement effects, sound effects, haptic feedback effects, color effects, scented effects, and so forth) of certain physical objects 28 of the amusement park 10. Specifically, a physical interaction system 80 may be used to generate the physical effects of certain physical objects 28 of the amusement park 10. In certain embodiments, as described in greater detail herein, the physical interaction system 80, which may include processing circuitry, such as a processor 82 (e.g., general purpose processor or other processor) and a memory 84, may process data from the mobile devices 26, the physical objects 28, the auxiliary devices 30, the image generation system 34, and the monitoring system 44 to determine the types of physical effects that should be generated for certain physical objects 28. In particular, it will be appreciated that all of the different types of data described as being communicated between the mobile devices 26, the physical objects 28, the auxiliary devices 30, the image generation system 34, and the monitoring system 44 may also be communicated to/from those components of the amusement park 10 and one or more communications interfaces 86 of the physical interaction system 80, and the physical interaction system 80 may determine certain physical effects that should be generated for certain physical objects 28 based at least in part on this data, and may communicate instructions to those physical objects 28 to generate the physical effects. These instructions may be encoded in programs or code stored in a tangible non-transitory computer-readable medium, such as the memory 84 and/or other storage. In certain embodiments, the processor 82 may be a general-purpose processor, system-on-chip (SoC) device, an application-specific integrated circuit (ASIC), or some other similar processor configuration.

Figure 3:
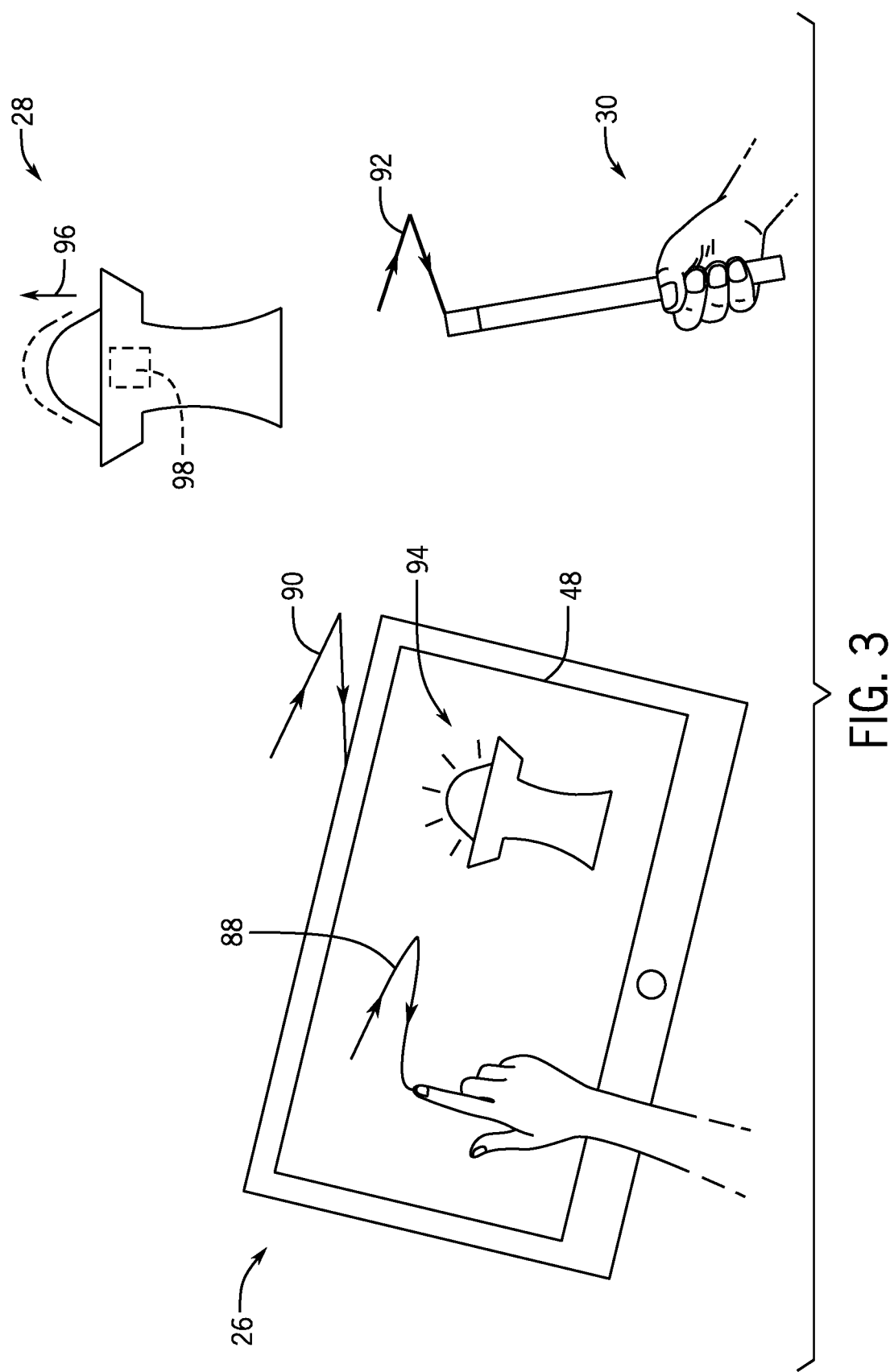
FIG. 3 illustrates a mobile device, an auxiliary device, and a physical object, in accordance with embodiments of the present disclosure.

In the interest of depicting the functionality of the system 32 illustrated in FIG. 2, FIG. 3 illustrates a mobile device 26, an auxiliary device 30, and a physical object 28, in accordance with embodiments of the present disclosure. The real-world environment of the amusement park 10 illustrated in FIG. 3 (e.g., including the depicted physical object 28) may be displayed on the display 48 of the mobile device 26. Specifically, as described in greater detail herein, the physical object 28 and the rest of the real-world environment of the amusement park 10 may be captured by the one or more cameras 46 of the mobile device 26, transmitted to the image generation system 34 as real-world images 38 (e.g., via the communications interfaces 54, 60), combined with AR images 40 by the image generation system 34, and transmitted back to the mobile device 26 for display via the display 48 of the mobile device 26 (e.g., via the communications interfaces 54, 60).

In addition, as described in greater detail herein, one or more user interactions relating to the mobile device 26 may be detected and used to both generate the AR images 40 as well as to cause certain physical effects to be implemented (e.g., for certain physical objects 28) in the real-world environment of the amusement park 10. In certain embodiments, the one or more user interactions relating to the mobile device 26 may include a pattern of movement relating to the mobile device 26. For example, in certain embodiments, as illustrated by path 88, the pattern of movement may be captured via the display 48 (e.g., a touch screen display) of the mobile device 26, for example, via finger swiping, finger pinching, finger tapping, and so forth, of the display 48. Alternatively, or in addition to, in certain embodiments, as illustrated by path 90, the pattern of movement may be an orientation, position, and/or motion of the mobile device 26 as detected by the tracking devices 62 of the monitoring system 44, the orientation and position sensors 42 of the mobile device 26, or the tracking devices 62 of the monitoring system 44 and the orientation and position sensors 42 of the mobile device 26 operating in conjunction with each other (e.g., with one tracking the orientation, position, motion, and so forth, of the mobile device 26 and the other calibrating or otherwise confirming the orientation, position, motion, and so forth, of the mobile device 26). Alternatively, or in addition to, in certain embodiments, as illustrated by path 92, the pattern of movement may be an orientation, position, and/or motion of the auxiliary device 30 as detected by the tracking devices 62 of the monitoring system 44.

Once the pattern of movement 88, 90, 92 has been detected, for example, by the mobile device 26 and/or the monitoring system 44, the pattern of movement 88, 90, 92 may be transmitted to the image generation system 34 (e.g., via the communication interfaces 54, 60, 64), and the image generation system 34 may generate one or more augmentations (i.e., the AR images 40) to be superimposed on the real-world images 38 (e.g., that are streamed to the mobile device 26) based at least in part on the pattern of movement 88, 90, 92. In particular, in certain embodiments, the image generation system 34 may include a pattern recognition software module as part of the instructions encoded in the memory 58 of the image generation system 34, which are executed by the processor 56 of the image generation system 34, that is configured to analyze data relating to the pattern of movement 88, 90, 92 to determine whether the pattern of movement 88, 90, 92 corresponds to a known pattern. For example, in certain embodiments, the image generation system 34 may perform a comparison of the pattern of movement 88, 90, 92 with a plurality of known patterns of movement that are, for example, stored in the memory 58 of the image generation system 34 to determine the one or more augmentations (i.e., the AR images 40) to be superimposed on the real-world images 38. In certain embodiments, if the pattern of movement 88, 90 92 corresponds to a particular stored pattern of movement, the image generation system 34 may cause certain visualizations to be superimposed on the real-world images 38. As but one non-limiting example, in certain embodiments, if the pattern of movement 88, 90, 92 is identified to correspond to a stored pattern of movement that correlates to particular magic spell, visual effects 94 (e.g., relating to the particular magic spell) may be generated as part of the AR images 40 that are to be superimposed on the real-world images 38. For example, in certain embodiments, the visual effects 94 may be representative of electrical sparks in the case of an electric-based magic spell, flames in the case of a fire-based magic spell, and so forth.

Similarly, once the pattern of movement 88, 90, 92 has been detected, for example, by the mobile device 26 and/or the monitoring system 44, the pattern of movement 88, 90, 92 may be transmitted to the physical interaction system 80 (e.g., via the communication interfaces 54, 64, 86), and the physical interaction system 80 may determine one or more physical effects to be implemented for one or more physical objects 28 (i.e., which may be part of the real-world images 38) based at least in part on the pattern of movement 88, 90, 92. In particular, in certain embodiments, the physical interaction system 80 may include a pattern recognition software module as part of the instructions encoded in the memory 84 of the physical interaction system 80, which are executed by the processor 82 of the physical interaction system 80, that is configured to analyze data relating to the pattern of movement 88, 90, 92 to determine whether the pattern of movement 88, 90, 92 corresponds to a known pattern. For example, in certain embodiments, the physical interaction system 80 may perform a comparison of the pattern of movement 88, 90, 92 with a plurality of known patterns of movement that are, for example, stored in the memory 84 of the physical interaction system 80 to determine the one or more physical effects to be implemented for the one or more physical objects 28. In certain embodiments, if the pattern of movement 88, 90 92 corresponds to a particular stored pattern of movement, the physical interaction system 80 may cause certain physical effects to be implemented for the one or more physical objects 28. As but one non-limiting example, in certain embodiments, again, if the pattern of movement 88, 90, 92 is identified to correspond to a stored pattern of movement that correlates to particular magic spell, the physical effects 96 to be implemented for the one or more physical objects 28 (e.g., relating to the particular magic spell) may be determined by the physical interaction system 80, and the physical interaction system 80 may communicate with the particular physical objects 28 (e.g., via the communication interfaces 78, 86) to cause the physical effects 96 to be implemented, for example, via physical actuation mechanisms 98 that are associated with the physical objects 28. For example, in certain embodiments, the physical effects 96 may be electrical sparks emanating from the physical object 28 as generated by an electrical power source in the case of an electric-based magic spell, flames emanating from the physical object 28 as generated by an ignition system in the case of a fire-based spell, movement of a portion of the physical object 28 in the case of a levitation spell (as illustrated in FIG. 3), and so forth.

As such, the embodiments described herein enable both an AR experience via the display 48 of the mobile device 26 as well as perceived physical interaction with physical objects 28 disposed about the real-world environment of the amusement park 10. In certain embodiments, the physical interaction with the physical objects 28 disposed about the real-world environment of the amusement park 10 may not only include movement of certain portions of the physical objects 28, but rather with more complex physical interaction with the amusement park itself. For example, in certain embodiments, if a particular user of a mobile device 26 (and/or auxiliary device 30, in certain embodiments) performs a certain number of interactions with other physical objects 28 disposed about the real-world environment of the amusement park 10 in a particular visit to the amusement park 10, the system 32 may determine that the user may physically interact with certain doors that may, for example, provide entrance to hidden caves that are also disposed about the amusement park 10.

Figure 4:
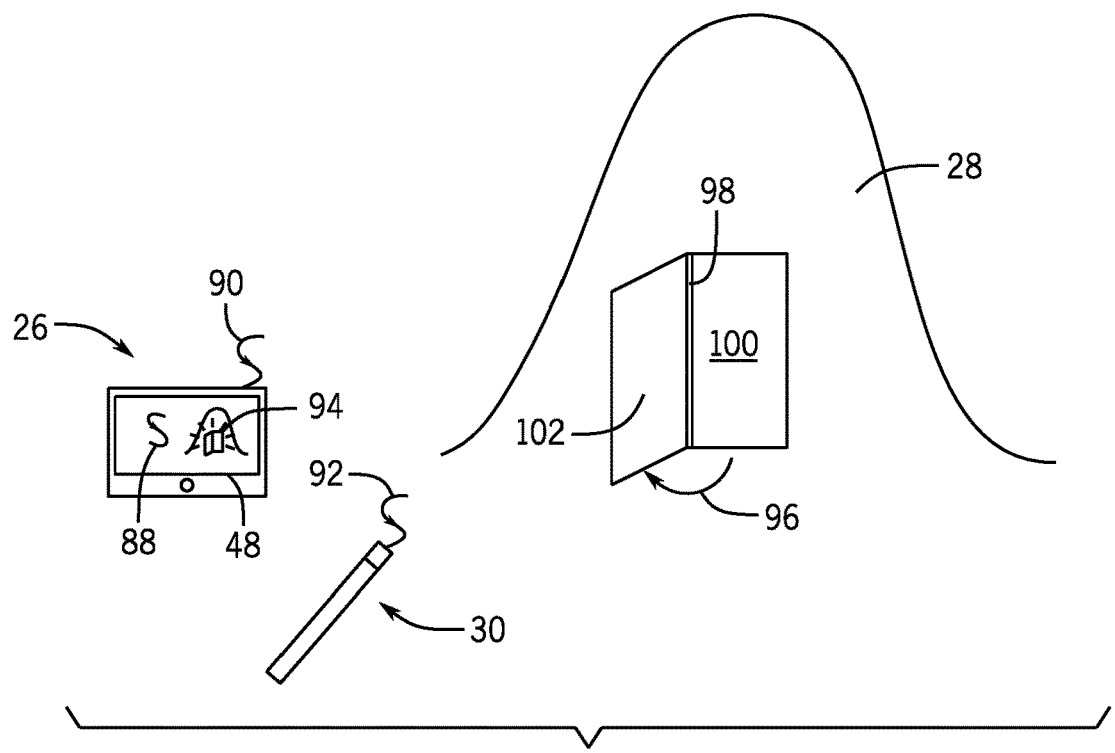
FIG. 4 illustrates an example of a user accessing a hidden cave via a door of the amusement park that has been unlocked based on the user physically interacting with a given number of physical objects using a mobile device (and/or auxiliary device), in accordance with embodiments of the present disclosure.

FIG. 4 illustrates an example of a user accessing a hidden cave 100 via a door 102 of the amusement park 10 that has been unlocked based on the user physically interacting with a given number of physical objects 28 using a mobile device 26 (and/or auxiliary device 30), in accordance with embodiments of the present disclosure. In certain embodiments, the ability to unlock the door 102 may only be the first requirement, with a second requirement being that the user perform another interaction with the mobile device 26 (and/or auxiliary device 30, in certain embodiments). For example, in certain embodiments, the user may need to execute a particular door opening spell via the mobile device 26 (and/or auxiliary device 30, in certain embodiments) by, for example, causing a particular pattern of movement 88, 90, 92 as described herein with respect to FIG. 3. Once the user performs the particular pattern of movement 88, 90, 92, the physical interaction system 80 may cause the door 102 to open (e.g., as a physical effect 96), for example, by causing actuation of a locking mechanism 98 (e.g., a magnetic lock, in certain embodiments). In addition, in certain embodiments, certain visual effects 94 may be caused to be displayed on the display 48 of the mobile device 26 by the image generation system 34 in conjunction with opening of the door 102.

Figure 5:
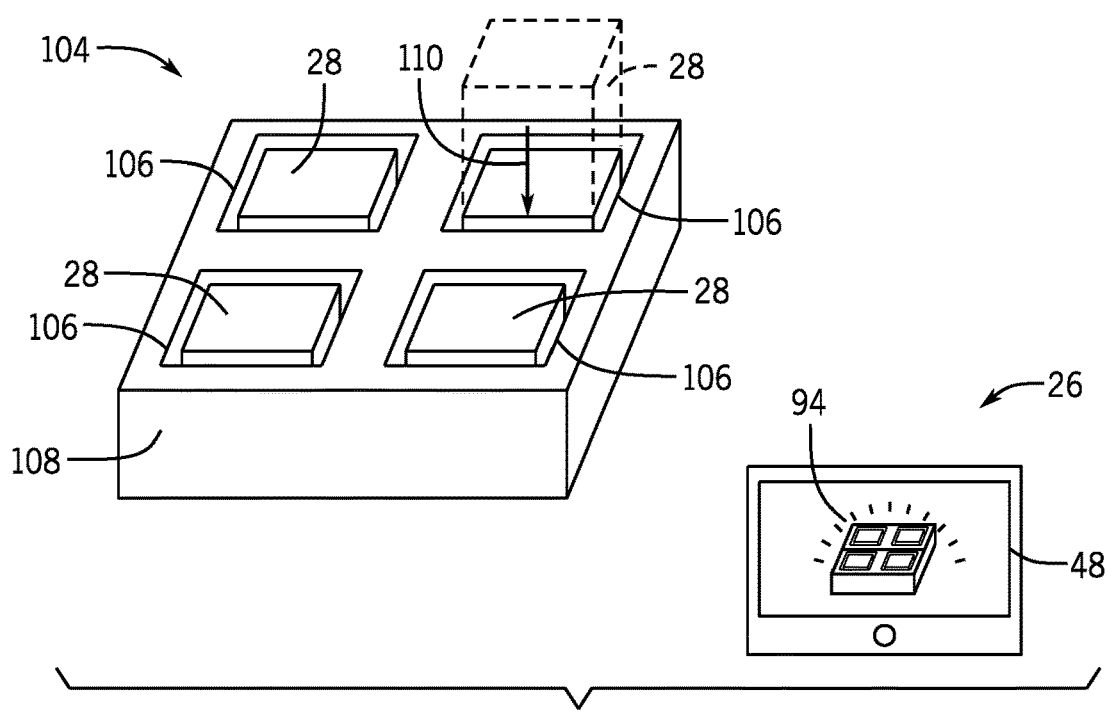
FIG. 5 illustrates an example of a puzzle that may be solved based on user interactions with a mobile device (and/or auxiliary device), in accordance with embodiments of the present disclosure.

Furthermore, in certain embodiments, the AR experience and physical interaction with physical objects 28 of the amusement park 10 that are enabled by the embodiments described herein may enable users to solve certain puzzles that are presented via certain physical objects 28. FIG. 5 illustrates an example of a puzzle 104 that may be solved based on user interactions with a mobile device 26 (and/or auxiliary device 30), in accordance with embodiments of the present disclosure. In the illustrated embodiment, a plurality of physical objects 28 may be physically interacted with via user interactions with the mobile device 26 (and/or auxiliary device 30, in certain embodiments). In certain embodiments, once the plurality of physical objects 28 have been caused to be physically moved into correct positions via the user interactions with the mobile device 26 (and/or auxiliary device 30, in certain embodiments), certain visual effects 94 may be caused to be displayed on the display 48 of the mobile device 26 by the image generation system 34. For example, in the embodiment illustrated in FIG. 5, the user interactions with the mobile device 26 (and/or auxiliary device 30, in certain embodiments) may cause the physical objects 28 to be placed within respective compartments 106 of a base 108, as illustrated by arrow 110, thereby solving the puzzle 104 and, in certain embodiments, causing the visual effects 94 to be displayed on the display 48 of the mobile device 26 by the image generation system 34.

Figure 6:
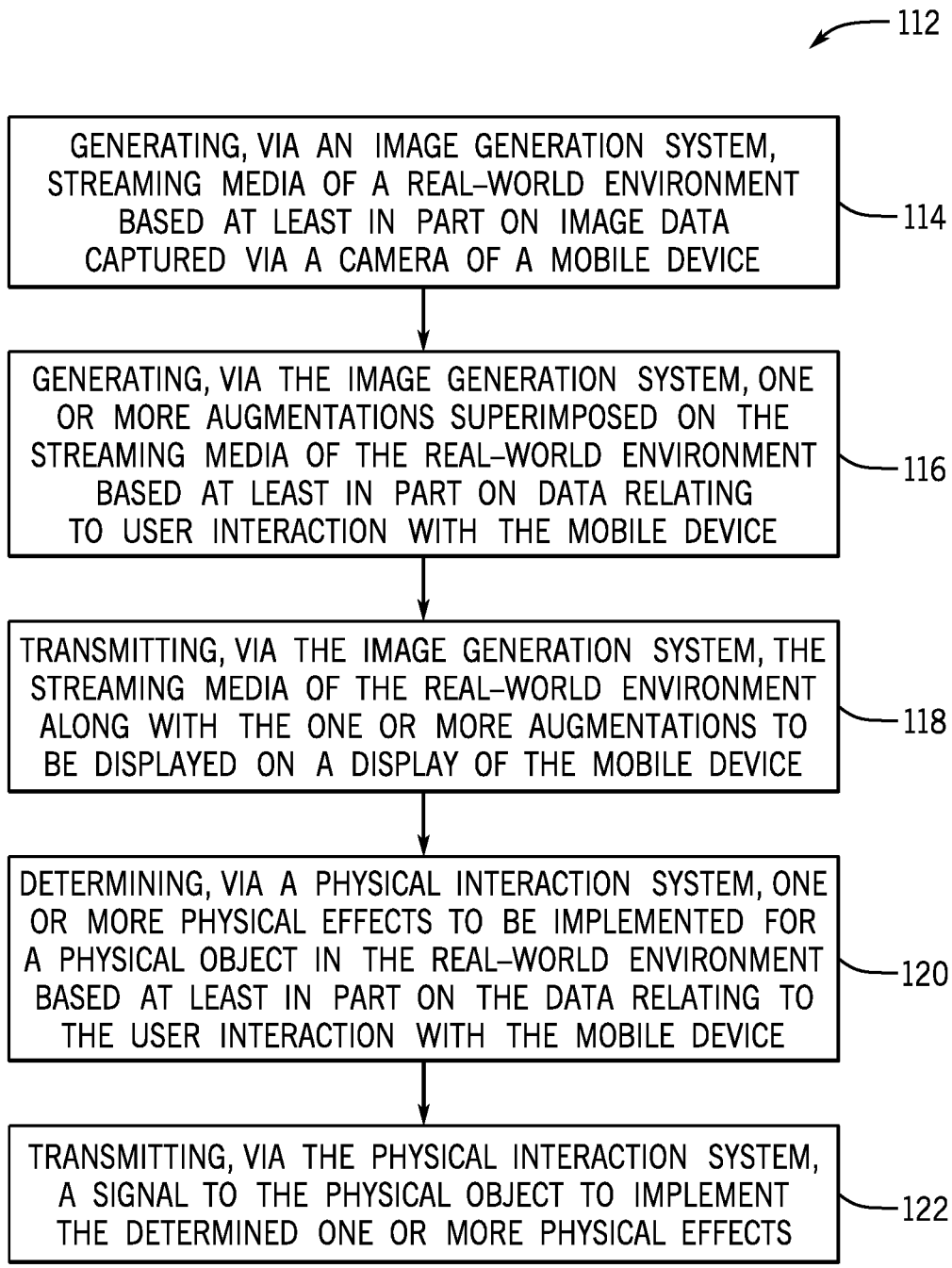
FIG. 6 illustrates a method of operating the system described herein, in accordance with embodiments of the present disclosure.

FIG. 6 illustrates a method 112 of operating the system 32 described herein, in accordance with embodiments of the present disclosure. For example, in certain embodiments, the method 112 includes generating, via the image generation system 34, streaming media of the real-world environment of the amusement park 10 based at least in part on image data (e.g., the real-world images 38) captured via one or more cameras 46 of the mobile device 26 (block 114). In addition, in certain embodiments, the method 112 includes generating, via the image generation system 34, one or more augmentations (e.g., the one or more AR images 40) superimposed on the streaming media of the real-world environment of the amusement park 10 based at least in part on data relating to user interaction with the mobile device 26 (block 116). In addition, in certain embodiments, the method 112 includes transmitting, via the image generation system 34, the streaming media of the real-world environment of the amusement park 10 along with the one or more augmentations to be displayed on a display 48 of the mobile device 46 (block 118). In addition, in certain embodiments, the method 112 includes determining, via the physical interaction system 80, one or more physical effects 96 to be implemented for a physical object 28 in the real-world environment of the amusement park 10 based at least in part on the data relating to the user interaction with the mobile device 26 (block 120). In addition, in certain embodiments, the method 112 includes transmitting, via the physical interaction system 80, a signal to the physical object 28 to implement the determined one or more physical effects 96.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:

1. A system, comprising:
an image generation system configured to be communicatively coupled to a mobile device, and configured to:
generate streaming media of a real-world environment based at least in part on image data captured via a camera of the mobile device;
generate one or more augmentations superimposed on the streaming media of the real-world environment based at least in part on data relating to user interaction with the mobile device; and
transmit the streaming media of the real-world environment along with the one or more augmentations to be displayed on a display of the mobile device; and
a physical interaction system configured to be communicatively coupled to the mobile device, and configured to:
determine one or more physical effects to be implemented for a physical object in the real-world environment based at least in part on the data relating to the user interaction with the mobile device; and
transmit a signal to the physical object to implement the determined one or more physical effects.

2. The system of claim 1, wherein the data relating to the user interaction comprises a pattern of movement.

3. The system of claim 2, wherein the image generation system comprises a pattern recognition module configured to analyze the data relating to the user interaction to determine whether the pattern of movement corresponds to a known pattern, and the image generation system is configured to generate the one or more augmentations based at least in part on whether the pattern of movement corresponds to the known pattern.

4. The system of claim 2, wherein the physical interaction system comprises a pattern recognition module configured to analyze the data relating to the user interaction to determine whether the pattern of movement corresponds to a known pattern, and the physical interaction system is configured to determine the one or more physical effects to be implemented based at least in part on whether the pattern of movement corresponds to the known pattern.

5. The system of claim 2, wherein the pattern of movement comprises a pattern of movement of the mobile device detected by a monitoring system monitoring the mobile device.

6. The system of claim 2, wherein the pattern of movement comprises an input received via a user interface of the mobile device.

7. The system of claim 1, wherein the user interaction comprises movement of the mobile device.

8. The system of claim 7, wherein the image generation system is configured to generate the streaming media of the real-world environment based at least in part on an orientation of the mobile device, a position of the mobile device, motion of the mobile device, or a combination thereof.

9. The system of claim 8, wherein the image generation system is configured to receive the orientation of the mobile device, the position of the mobile device, the motion of the mobile device, or the combination thereof, from the mobile device.

10. The system of claim 8, comprising a monitoring system configured to monitor physical attributes of the mobile device to determine the orientation of the mobile device, the position of the mobile device, the motion of the mobile device, or the combination thereof.

11. The system of claim 1, wherein the user interaction comprises an input received via a user interface of the mobile device.

12. The system of claim 1, wherein the image generation system is configured to generate the one or more augmentations superimposed on the streaming media of the real-world environment based at least in part on data relating to user interaction with an auxiliary device used in conjunction with the mobile device.

13. The system of claim 1, wherein the physical interaction system is configured to determine the one or more physical effects to be implemented for the physical object in the real-world environment based at least in part on data relating to user interaction with an auxiliary device used in conjunction with the mobile device.

14. The system of claim 1, wherein the image generation system is configured to generate the one or more augmentations superimposed on the streaming media of the real-world environment based at least in part on data relating to one or more physical objects disposed in the real-world environment.

15. A method, comprising:
receiving, via an image generation system, a real-time video data stream from a mobile device;
generating, via the image generation system, a visualization of a real-world environment based at least in part on the received real-time video data stream;
overlaying, via the image generation system, an augmented reality (AR) image onto the visualization of the real-world environment based at least in part on data relating to user interaction with the mobile device;
determining, via a physical interaction system, one or more physical effects to be implemented for a physical object in the real-world environment based at least in part on the data relating to the user interaction with the mobile device;
transmitting, via the image generation system, the overlaid AR image along with the visualization of the real-world environment to the mobile device; and
transmitting, via the physical interaction system, a signal to the physical object to implement the determined one or more physical effects.

16. The method of claim 15, wherein the data relating to the user interaction comprises a pattern of movement.

17. The method of claim 16, comprising overlaying, via the image generation system, the AR image onto the visualization of the real-world environment based at least in part on whether the pattern of movement corresponds to a known pattern.

18. The method of claim 16, comprising determining, via the physical interaction system, the one or more physical effects to be implemented for the physical object in the real-world environment based at least in part on whether the pattern of movement corresponds to a known pattern.

19. The method of claim 16, wherein the pattern of movement comprises a pattern of movement of the mobile device detected by a monitoring system monitoring the mobile device.

20. The method of claim 16, wherein the pattern of movement comprises an input received via a user interface of the mobile device.

21. The method of claim 15, comprising overlaying, via the image generation system, the AR image onto the visualization of the real-world environment based at least in part on an orientation of the mobile device, a position of the mobile device, motion of the mobile device, or a combination thereof.

22. The method of claim 21, comprising detecting the orientation of the mobile device, the position of the mobile device, the motion of the mobile device, or the combination thereof, using one or more sensors of the mobile device.

23. The method of claim 21, comprising detecting the orientation of the mobile device, the position of the mobile device, the motion of the mobile device, or the combination thereof, using a monitoring system monitoring the mobile device.

* * * * *